(12) United States Patent
Iwa et al.

(10) Patent No.: US 10,753,331 B2
(45) Date of Patent: Aug. 25, 2020

(54) DIAPHRAGM DAMPER DEVICE COILED WAVE SPRING AND DAMPER SYSTEM

(71) Applicant: EAGLE INDUSTRY CO., LTD., Tokyo (JP)

(72) Inventors: Toshiaki Iwa, Tokyo (JP); Yoshihiro Ogawa, Tokyo (JP); Yasushi Fujiwara, Tokyo (JP); Yusuke Sato, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 18 days.

(21) Appl. No.: 15/743,692

(22) PCT Filed: Jul. 28, 2016

(86) PCT No.: PCT/JP2016/072115
§ 371 (c)(1),
(2) Date: Jan. 11, 2018

(87) PCT Pub. No.: WO2017/022605
PCT Pub. Date: Feb. 9, 2017

(65) Prior Publication Data
US 2018/0195478 A1    Jul. 12, 2018

(30) Foreign Application Priority Data
Jul. 31, 2015    (JP) .................................. 2015-152621

(51) Int. Cl.
*F02M 55/04*    (2006.01)
*F16J 3/02*    (2006.01)
(Continued)

(52) U.S. Cl.
CPC ........ *F02M 55/04* (2013.01); *F02M 37/0041* (2013.01); *F04B 11/0008* (2013.01);
(Continued)

(58) Field of Classification Search
CPC .. F02M 55/04; F02M 37/0041; F02M 59/445; F02M 2200/315;
(Continued)

(56) References Cited

U.S. PATENT DOCUMENTS 1,234,636 A * 7/1917 Craven .................... F16N 11/04
184/45.1
1,784,573 A * 12/1930 Butler ...................... F16N 11/04
184/45.1
(Continued)

FOREIGN PATENT DOCUMENTS

EP        2873888         5/2015
JP      U2586112 Y2      9/1998
(Continued)

OTHER PUBLICATIONS

International Search Report dated Aug. 20, 2016 from corresponding PCT Patent Application No. PCT/JP2016/072115.
(Continued)

*Primary Examiner* — Craig M Schneider
*Assistant Examiner* — David R Deal
(74) *Attorney, Agent, or Firm* — Grogan, Tuccillo & Vanderleeden, LLP (57) ABSTRACT

A coiled wave spring used by a diaphragm damper device and arranged in a fuel chamber defined by a housing and a cover is provided. The coiled wave spring is configured to be arranged between a diaphragm damper of the diaphragm damper device and the cover. The coiled wave spring is configured to fix the diaphragm damper to the housing with its elastic force. The coiled wave spring includes a coil portion, a winding initiation portion, and a winding termination portion. The winding initiation portion and the winding termination portion form flat seat windings. The seat windings each have a larger outer diameter than the coil
(Continued)

portion. One of the seat windings is configured to be fixed to the diaphragm damper.

15 Claims, 5 Drawing Sheets

(51) Int. Cl.
| | | |
|---|---|---|
| *F16J 15/52* | (2006.01) | |
| *F16F 1/06* | (2006.01) | |
| *F04B 11/00* | (2006.01) | |
| *F02M 37/00* | (2006.01) | |
| *F16F 1/04* | (2006.01) | |
| *F02M 59/44* | (2006.01) | |
| *F16F 9/04* | (2006.01) | |

(52) U.S. Cl.
CPC .......... *F04B 11/0033* (2013.01); *F16F 1/048* (2013.01); *F16F 1/06* (2013.01); *F16J 3/02* (2013.01); *F16J 15/52* (2013.01); *F02M 59/44* (2013.01); *F02M 59/445* (2013.01); *F02M 2200/26* (2013.01); *F02M 2200/315* (2013.01); *F02M 2200/8053* (2013.01); *F16F 9/0409* (2013.01)

(58) Field of Classification Search
CPC ......... F02M 2200/8053; F04B 11/0008; F04B 11/0033; F16F 1/02; F16F 1/048; F16F 1/06; F16F 1/328; F16F 9/04; F16F 9/0409; F16J 3/02; F16J 15/52
USPC .......................................................... 138/30
See application file for complete search history.

(56) References Cited

U.S. PATENT DOCUMENTS

| | | | | | |
|---|---|---|---|---|---|
| 3,015,482 | A * | 1/1962 | Maker | ........................ | F16F 1/02 267/180 |
| 3,021,129 | A * | 2/1962 | Maker | ........................ | F16F 1/02 267/180 |
| 3,851,661 | A * | 12/1974 | Fernandez | ................ | F16K 7/02 137/558 |
| 5,210,382 | A * | 5/1993 | Paley | ....................... | F16F 15/06 138/30 |
| 5,542,453 | A * | 8/1996 | Gabas | ..................... | B60T 11/26 138/30 |
| 5,964,333 | A * | 10/1999 | Grosspietsch | .......... | F16D 23/14 192/85.54 |
| 6,068,250 | A * | 5/2000 | Hawkins | ................. | F16F 1/328 267/148 |
| 6,669,184 | B2 * | 12/2003 | Cai | ......................... | F16F 1/328 267/162 |
| 7,210,181 | B1 * | 5/2007 | Price | ...................... | A47C 23/02 267/162 |
| 8,752,588 | B2 * | 6/2014 | Watanabe | ................ | B41J 2/175 138/26 |
| 2005/0126039 | A1 * | 6/2005 | LeVert | ................. | A43B 7/1425 36/27 |
| 2013/0230417 | A1 * | 9/2013 | Kobayashi | .......... | F04B 11/0008 417/395 |
| 2013/0276929 | A1 | 10/2013 | Oikawa | | |
| 2015/0132080 | A1 * | 5/2015 | Tran | ........................ | F16F 1/328 411/517 |
| 2019/0024646 | A1 | 1/2019 | Kurt et al. | | |

FOREIGN PATENT DOCUMENTS

| | | |
|---|---|---|
| JP | 2000046071 A | 2/2000 |
| JP | 2006105233 A | 4/2006 |
| JP | 2013227877 A | 11/2013 |
| WO | 2017118564 | 7/2017 |

OTHER PUBLICATIONS

International Preliminary Report on Patentability dated Feb. 6, 2018.

Extended European Search Report dated Mar. 21, 2019 issued in corresponding EP Patent Application No. 16832884.7.

* cited by examiner

DIAPHRAGM DAMPER DEVICE COILED WAVE SPRING AND DAMPER SYSTEM

CROSS REFERENCE TO RELATED APPLICATIONS

This application is a national stage of International Application No. PCT/JP2016/072115 filed Jul. 28, 2016 which is based upon and claims priority to Japanese Patent Application No. 2015-152621 filed on Jul. 31, 2015, the entire contents of which are incorporated herein by reference.

TECHNICAL FIELD

The present invention relates to a coiled wave spring for a pulsation-absorbing diaphragm damper device used at a location where pulsation of a high-pressure fuel pump or the like occurs and to a damper system.

BACKGROUND ART

A known device that absorbs such type of pulsation includes a diaphragm damper device located in, for example, a fluid passage of a high-pressure fuel pump (hereinafter referred to as "prior art," refer to, for example, patent document 1). In the prior art, a damper device arranged in a fluid passage of a high-pressure fuel pump absorbs the pressure pulsation of the fuel discharged from the high-pressure fuel pump and reduces the pulsation width of the fuel pressure to stabilize the injection amount of the fuel.

Figure 5:
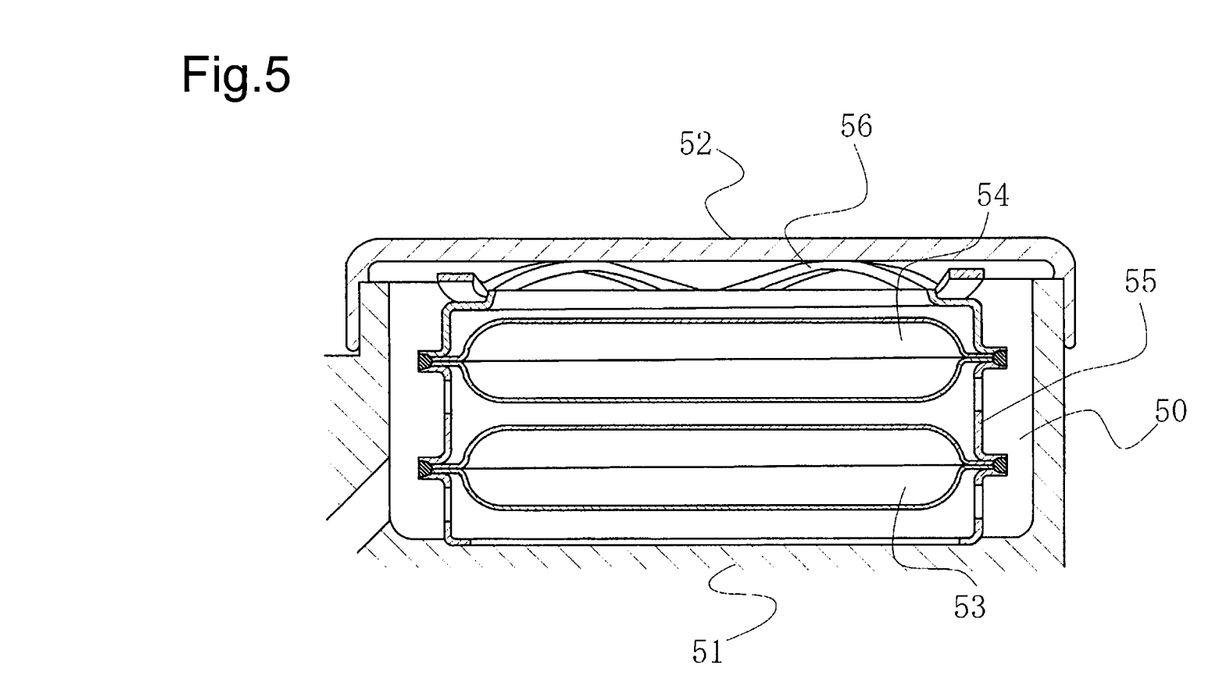
FIG. 5 is a cross-sectional view showing the prior art.

As shown in FIG. 5, in order to increase the effect for reducing the pulsation of the fuel pressure, the diaphragm damper device of the prior art includes two diaphragms 53 and 54 arranged in the vertical direction in a fuel chamber 50, which is defined by a housing 51 and a cover 52. The two diaphragms 53 and 54 are supported by a support 55. An elastic force of a wave washer 56 arranged between an upper surface of the support 55 and an inner surface of the cover 52 pushes the two diaphragms 53 and 54 against an inner wall of the fuel chamber 50 and fixes the two diaphragms 53 and 54 to the housing 51.

The fuel chamber 50 is arranged in part of a high-pressure fuel pump where space is limited. Further, when a plurality of diaphragm dampers are stacked in the fuel chamber 50, the height of the means for fixing the diaphragm dampers is limited to extremely small dimensions. Thus, in the prior art, the wave washer 56 that is small in height is used as the fixing means. However, it is difficult to stably and rigidly fix the diaphragm dampers with the wave washer 56. Further, the wave washer 56 is generally manufactured by punching a plate with a press die. Thus, the yield is low and the manufacturing cost is high. In addition, it is difficult to make fine changes to the shape of the wave washer 56.

PRIOR ART DOCUMENT

Patent Document

Patent Document 1: Japanese Laid-Open Patent Publication No. 2013-227877

SUMMARY OF THE INVENTION

Problems that are to be Solved by the Invention

It is an object of the present invention to provide a coiled wave spring for a diaphragm damper device that produces a strong spring force through stable deflection and a damper system including such a coiled wave spring.

Means for Solving the Problem

To achieve the above object, a coiled wave spring used by a diaphragm damper device and arranged in a fuel chamber defined by a housing and a cover is provided. The coiled wave spring is configured to be arranged between a diaphragm damper of the diaphragm damper device and the cover. The coiled wave spring is configured to fix the diaphragm damper to the housing with its elastic force. The coiled wave spring includes a coil portion, a winding initiation portion, and a winding termination portion. The winding initiation portion and the winding termination portion form flat seat windings. The seat windings each have a larger outer diameter than the coil portion. One of the seat windings is configured to be fixed to the diaphragm damper.

In this feature, even when the height of the fuel chamber is limited, the diaphragm dampers can be fixed to the housing by a strong spring force produced by stable deflection. Further, the coiled wave spring has a higher yield and a lower manufacturing cost than the wave washer used in the prior art. In addition, the shape of the coiled wave spring can be easily changed.

Further, the outer diameter of the seat windings is increased. This ensures the position where the coiled wave spring is fixed to the diaphragm dampers and integrates the coiled wave spring and the diaphragm damper. Also, the seat windings are flat. This limits situations in which the fixed position adversely affects the compression of the spring and allows the spring force to evenly act on the diaphragm dampers. Additionally, the coiled wave spring and the diaphragm dampers can be transported in a state assembled as a single unit and can be coupled to other members as a single unit. This allows for easy coupling.

In addition, one of the seat windings may be configured to be fixed to the diaphragm damper, and the other one of the seat windings may be fixed to a coupling member attached to an inner side of the cover.

In this feature, the diaphragm damper device can be fixed to multiple types of covers having different shapes by the coiled wave spring having the same shape just by changing the shape of the coupling member without preparing a coiled wave spring shaped in conformance with the shape of the cover.

Further, each of the seat windings may be configured to be fixed to the diaphragm damper or a coupling member by swaging the diaphragm damper or the coupling member.

This feature allows the coiled wave spring, the diaphragm dampers or the coiled wave spring, and the coupling member to be easily integrated.

EMBODIMENTS OF THE INVENTION

The embodiment of the present invention will now be exemplified with reference to the drawings. However, as long as there is no explicit description, the range of the present invention is not limited only to the dimension, the material, the shape, the relative arrangement, and the like of components described in the embodiment.

First Embodiment

A diaphragm damper device 10 according to a first embodiment of the present invention will now be described with reference to FIGS. 1 to 4.

Figure 1:
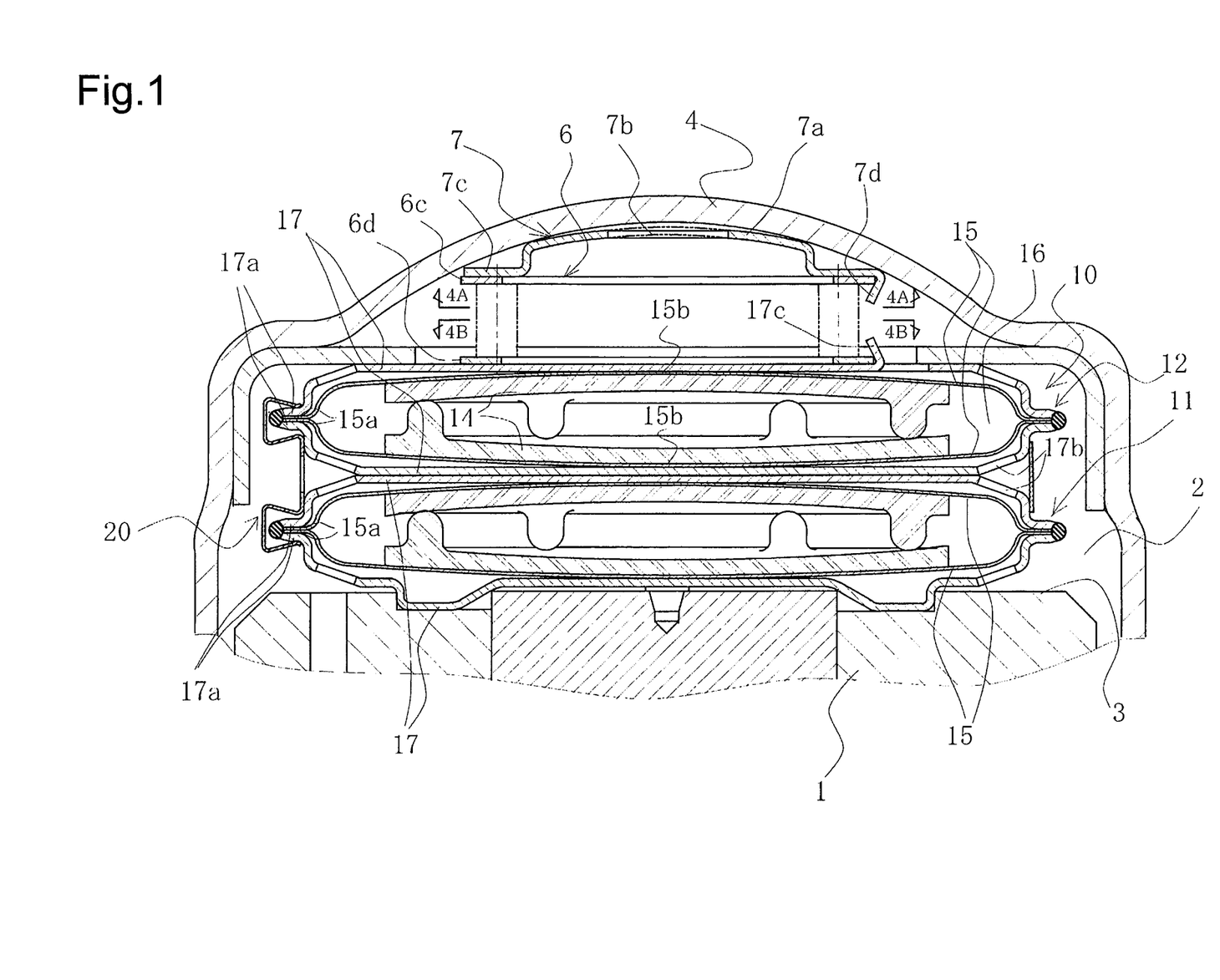
FIG. 1 is a vertical, cross-sectional view showing a diaphragm damper device according to a first embodiment of the present invention.

The diaphragm damper device 10 shown in FIG. 1 is used in a high-pressure pump that reciprocates a plunger to pressurize the fuel supplied from a fuel tank and force the fuel toward an injector.

The high-pressure pump includes a fuel chamber 2 that can contain fuel supplied from the outside. The high-pressure pump pressurizes and discharges the fuel by repeating a "suction process" that draws the fuel from the fuel chamber 2 into a pressurizing chamber when the plunger descends, a "metering process" that returns some of the fuel of the pressurizing chamber to the fuel chamber 2 when the plunger ascends, and a "pressurizing process" that pressurizes the fuel when the plunger further ascends after closing a suction valve.

The diaphragm damper device 10 is used to reduce the pulsation generated in the fuel chamber 2 of such a high-pressure pump.

As shown in FIG. 1, the fuel chamber 2 is defined by an upper portion 3 of a housing 1 of the high-pressure pump and an inner surface of a tubular cover 4 that includes a closed end. The cover 4 is fitted onto and fixed to the upper portion 3 of the housing 1. Although not illustrated in the drawings, a lower portion of the cover 4 is joined in contact with the housing 1.

In FIG. 1, the upper side on the plane of the drawing is referred to as the upper side of the device, and the lower side on the plane of the drawing is referred to as the lower side of the device.

The diaphragm damper device 10 is arranged in the fuel chamber 2. The diaphragm damper device 10 includes two diaphragm dampers 11 and 12 arranged (stacked) in the vertical direction to increase the effect for reducing fluid pressure pulsation.

The lower diaphragm damper 11 and the upper diaphragm damper 12 have the same basic structure.

The diaphragm dampers 11 and 12 each include two disk-shaped diaphragms 15 and 15 and a high-pressure chamber 16 defined between the two disk-shaped diaphragms 15 and 15. High-pressure gas is enclosed in the high-pressure chamber 16. The two disk-shaped diaphragms 15 and 15 each have an outer side covered by two disk-shaped cover members 17 and 17.

Two rubber elastic members 14 and 14 are arranged in each high-pressure chamber 16.

The diaphragm dampers 11 and 12 are separately manufactured and arranged in the vertical direction inside a space defined by the housing 1 and the inner surface of the cover 4.

Each cover member 17 includes a plurality of holes 17b. The holes 17b allow for the flow of fluid such as fuel. The holes 17b allow an external fluid to freely enter and exit the space between the cover member 17 and the corresponding diaphragm 15.

The holding member 20 integrally holds the two diaphragm dampers 11 and 12, which are arranged in the vertical direction.

The two diaphragm dampers 11 and 12 are mounted on the upper portion 3 of the housing 1 and downwardly biased so that they are pressed toward the housing 1 by a coupling member 7 and a coiled wave spring 6, which are attached to the inner side of the cover 4. This fixes the two diaphragm dampers 11 and 12 to the housing 1.

The cover 4, the diaphragm damper device 10 covered by the cover 4, and the coiled wave spring 6 and the coupling member 7 that are arranged between the cover 4 and the diaphragm damper device 10 form a damper system.

The two disk-shaped diaphragms 15 and 15 are formed with the same shape from a thin, flexible metal plate so that central portions 15b and 15b are flexible. Further, the two disk-shaped cover members 17 and 17 are formed from a metal and support the diaphragms 15 and 15. The cover members 17 and 17 are thicker than the diaphragms 15 and 15.

The two disk-shaped diaphragms 15 and 15 include circumferential regions 15a and 15a that are overlapped with each other. The overlapped circumferential regions 15a and 15a are held by holding portions 17a and 17a of circumferential regions of the pair of disk-shaped covers 17 and 17.

Figure 2:
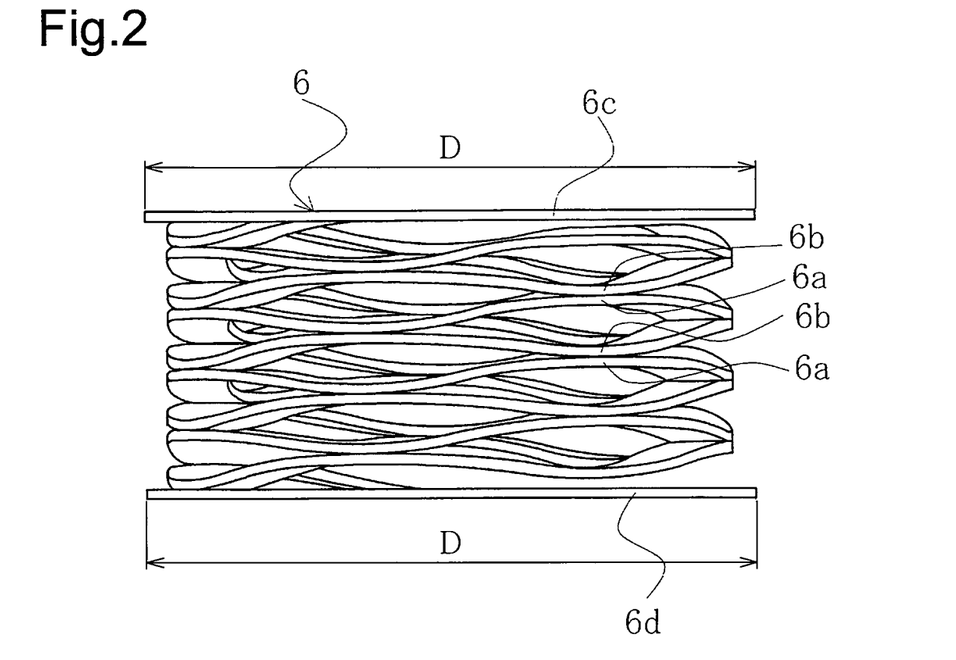
FIG. 2 is a front view showing a coiled wave spring used in the diaphragm damper device of FIG. 1.
Figure 3:
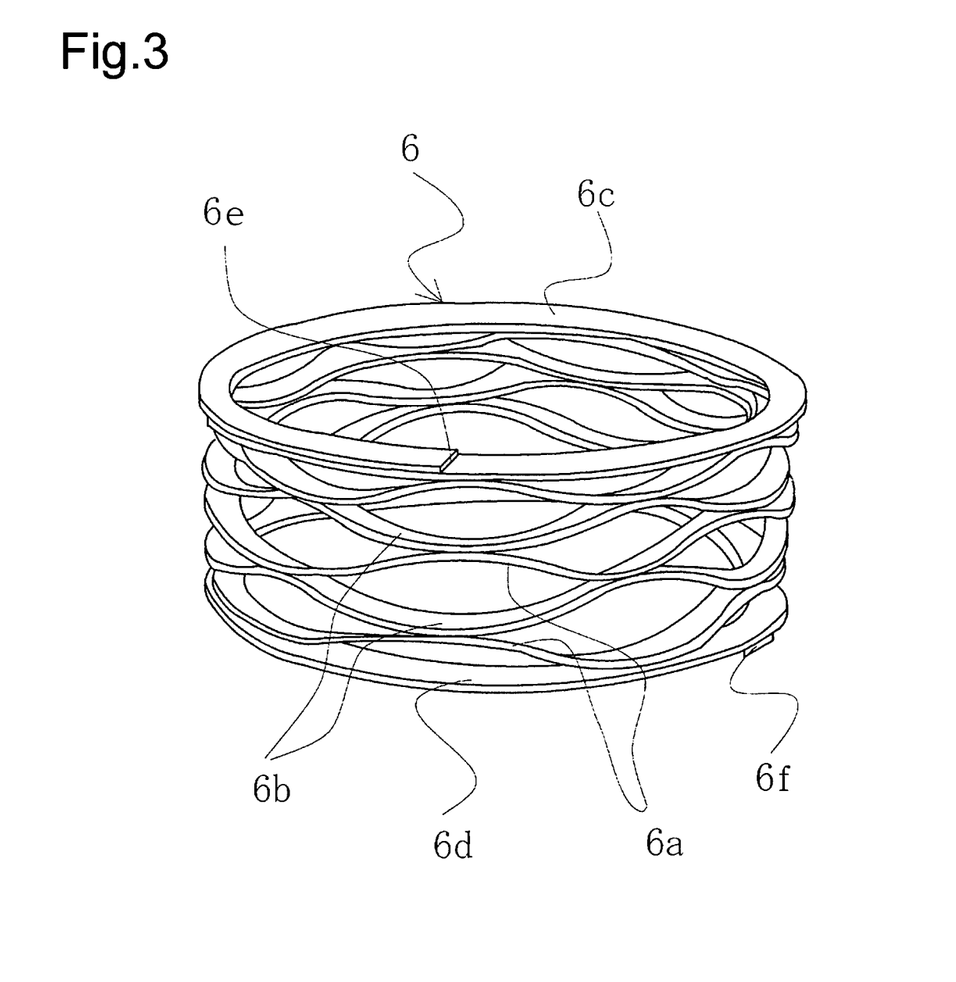
FIG. 3 is a perspective view showing the coiled wave spring of FIG. 2.

The coiled wave spring 6 will now be described with reference to FIGS. 2 and 3.

The coiled wave spring 6 is formed by spirally coiling a flat wire formed from a spring material into layers of windings and processing the flat wire in a wavelike manner. The flat wire is spirally coiled so that ridges 6a and valleys 6b are opposed to those of adjacent waved windings in the vertical direction. The overall coiled wave spring 6 is tubular and axially short. The coiled wave spring 6 is a spring that mainly absorbs force in a compression direction.

The coiled wave spring 6 includes a coil portion, a winding initiation portion, and a winding termination portion. The coil portion is extended spirally and curved in a wavelike manner. The winding initiation portion and the winding termination portion extend from the two ends of the coil. The winding initiation portion and the winding termination portion respectively form flat seat windings 6c and 6d, respectively. That is, the seat windings 6c and 6d are not curved in a wavelike manner and extend flat over substantially a single turn. The seat windings 6c and 6d include ends 6e and 6f, respectively. In the following description, the seat winding 6c may be referred to as the upper seat winding 6c, and the seat winding 6d may be referred to as the lower seat winding 6d.

The coiled wave spring 6 produces a strong spring force through stable deflection. The coiled wave spring 6 can decrease the height without changing the radial dimension. Thus, the coiled wave spring 6 has a benefit in that the spring can be reduced in size. That is, a coil spring mainly receives the torsional stress, whereas a coiled wave spring mainly receives the bending stress.

Further, the coiled wave spring does not need to be stacked like disc springs and does not separate into pieces. In addition, the wave washers used in the prior art are generally formed by punching a plate with a press die. Thus, the wave washers have a low yield and a high manufacturing cost. In addition, it is difficult to make fine changes to the shape of the wave washer. In this regard, the coiled wave spring can be manufactured just by bending a flat wire. Thus, substantially 100% of the material can be effectively used. Further, the coiled wave spring has benefits in that the yield is good, the manufacturing cost is low, and the shape can be easily changed.

The coiled wave spring 6 is formed so that the seat windings 6c and 6d have an outer diameter D that is greater than the outer diameter of the coil portion (portion of coiled wave spring 6 excluding seat windings 6c and 6d). This allows the lower seat winding 6d to be easily fixed to the diaphragm damper 12 and the upper seat winding 6c to be easily fixed to the coupling member 7.

The method for fixing the coiled wave spring 6 to the coupling member 7 and the diaphragm dampers 11 and 12 will now be described with reference to FIGS. 1 and 4.

The method for fixing the coiled wave spring 6 to the coupling member 7 will now be described.

As shown in FIG. 1, the coupling member 7 is disk-shaped and includes a central portion 7a shaped in conformance with an inner wall surface of the cover 4. The central portion 7a includes a hole 7b.

Further, the coupling member 7 includes a flat circumferential region 7c shaped to be engageable with the upper seat winding 6c of the coiled wave spring 6.

The circumferential region 7c of the coupling member 7 includes a plurality of tabs 7d extending from an outer edge of the circumferential region 7c. The tabs 7d are formed when, for example, punching the coupling member 7.

When the coiled wave spring 6 is fixed to the coupling member 7, the tabs 7d are swaged so that the upper seat winding 6c of the coiled wave spring 6 is bent from the outer side. The upper seat winding 6c has a larger diameter than the coil portion. This facilitates swaging of the tabs 7d and ensures that swaging is performed.

Figure 4A:
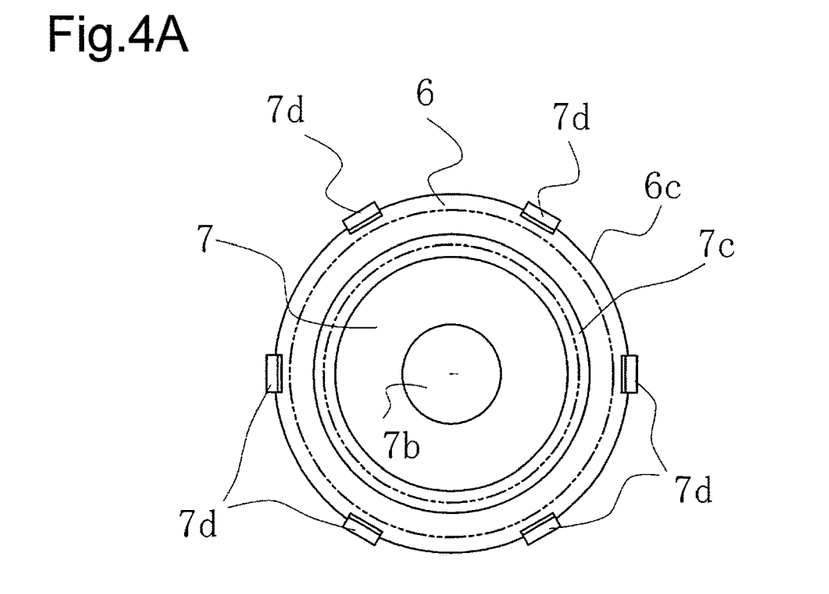
FIG. 4A is a cross-sectional view taken along line 4A-4A in FIG. 1.

As shown in FIG. 4A, six tabs 7d are arranged on the circumferential region 7c at equal intervals.

The number and arrangement of the tabs 7d are not limited as described above. Only at least two or more tabs 7d need to be arranged on the circumferential region 7c. Further, the width and length of each tab 7d are matters of design.

The method for fixing the coiled wave spring 6 to the diaphragm dampers 11 and 12 will now be described.

As described above, each of the two diaphragm dampers 11 and 12 arranged in the vertical direction includes the two disk-shaped diaphragms 15 and 15. The two disk-shaped diaphragms 15 and 15 are each covered by the two disk-shaped cover members 17 and 17. The holding member 20 integrally holds the two diaphragm dampers 11 and 12 with the cover members 17.

Among the cover members 17 of the upper diaphragm damper 12, the upper cover member 17 includes a plurality of tabs 17c.

The tabs 17c are formed in the radial direction of the cover member 17 at positions conforming to the outer diameter D of the lower seat winding 6d of the coiled wave spring 6. For example, when the cover member 17 is formed through punching, punched portions 18 are formed on the cover member 17 to leave portions of the tabs 17c.

Figure 4B:
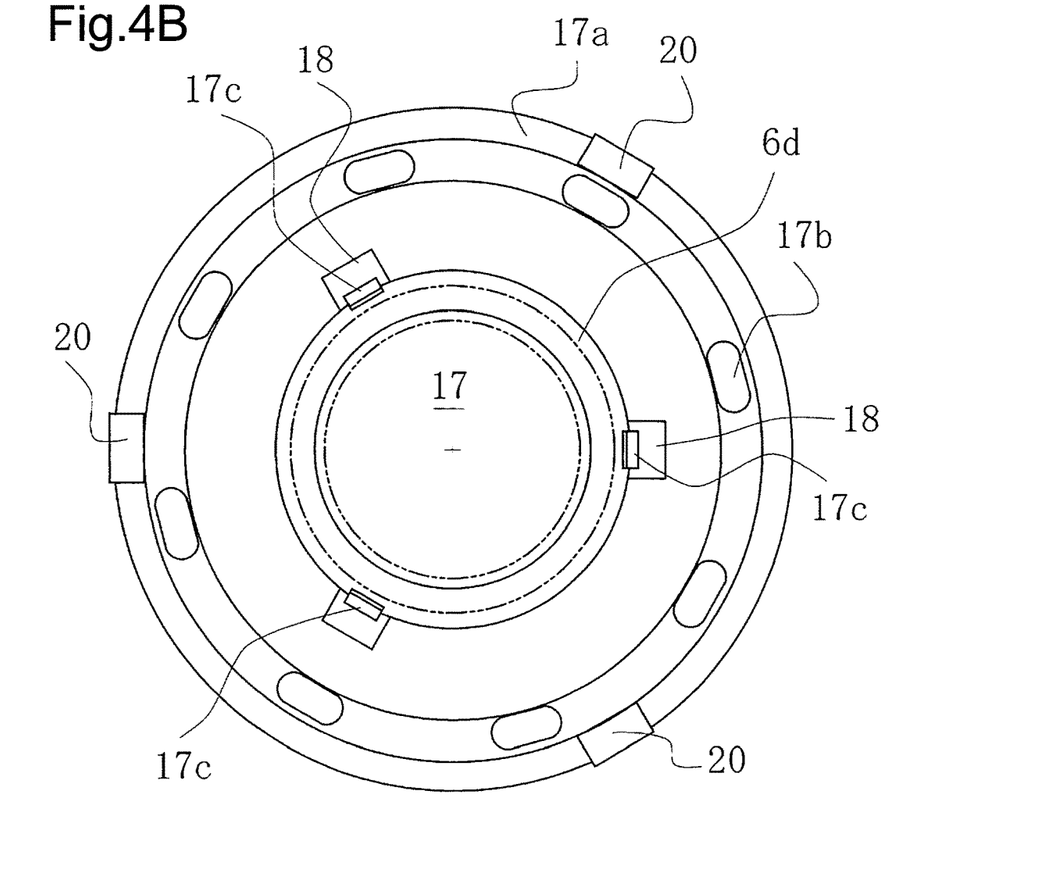
FIG. 4B is a cross-sectional view taken along line 4B-4B in FIG. 1.

As shown in FIG. 4B, three tabs 17c are arranged on the cover member 17 at equal intervals.

The number and arrangement of the tabs 17c are not limited as described above. Only at least two or more tabs 17c need to be arranged at the cover member 17. Further, the width and length of each tab 17c are matters of design.

The diaphragm damper device 10 of the first embodiment has the above structure and the advantages described below.

(1) The coiled wave spring 6 used by the diaphragm damper device 10, which is arranged in the fuel chamber 2 defined by the housing 1 and the cover 4, is arranged between the diaphragms 11 and 12 and the cover 4. The coiled wave spring 6 is configured to fix the diaphragm dampers 11 and 12 to the housing 1 with its elastic force. Thus, even when the height of the fuel chamber 2 is limited, the diaphragm dampers 11 and 12 can be fixed to the housing 1 by a strong spring force produced by stable deflection.

Further, the coiled wave spring 6 has a higher yield and a lower manufacturing cost than the wave washer used in the prior art. In addition, the shape of the coiled wave spring 6 can be easily changed.

(2) In order to obtain the diaphragm damper device 10 that has a high fluid pressure pulsation reducing effect, even though the diaphragm dampers 11 and 12 are arranged in the vertical direction further limiting the remaining height in the fuel chamber 2, the diaphragm dampers 11 and 12 can be fixed to the housing 1 with a strong spring force produced by stable deflection.

(3) The lower end (lower seat winding 6d) of the coiled wave spring 6 is fixed to the diaphragm dampers 11 and 12, and the upper end (upper seat winding 6c) of the coiled wave spring 6 is fixed to the coupling member 7 arranged at the upper portion of the coiled wave spring 6. This ensures that the coiled wave spring 6 is held between the diaphragm dampers 11 and 12 and the coupling member 7. Further, the strong spring force produced by stable deflection of the coiled wave spring 6 can be effectively used to hold the diaphragm dampers 11 and 12.

(4) The outer diameter D of the flat seat windings 6c and 6d is greater than the outer diameter of the coil portion (portion of coiled wave spring excluding seat windings 6c and 6d). The tabs 17c of the diaphragm damper 12 are swaged onto the lower seat winding 6d that has a large outer diameter, and the tabs 7d of the coupling member 7 are swaged onto the upper seat winding 6c that has a large outer diameter. This integrates the coiled wave spring 6, the coupling member 7, and the diaphragm dampers 11 and 12, allows the spring force to evenly act on the diaphragm dampers 11 and 12, and limits the displacement of the diaphragm dampers 11 and 12 in the radial direction. Further, the coiled wave spring 6, the coupling member 7, and the diaphragm dampers 11 and 12 can be transported in a state assembled as a single unit and can be coupled to other members as a single unit. This allows for easy coupling.

The embodiment of the present invention has been described with reference to the drawings. However, the specific structure is not limited to the embodiment. Modifications and additions that do not depart from the scope of the present invention are included in the present invention.

In the first embodiment, the two diaphragm dampers 11 and 12 are arranged in the vertical direction. However, the present invention is not limited to such a structure. For example, the number of diaphragm dampers may be one. This also obtains the advantages described above. Further, the number of diaphragm dampers may be two or greater.

In addition, in the first embodiment, the coupling member 7 is disk-shaped, and the central portion 7a is shaped in conformance with the inner wall surface of the cover 4. However, the present invention is not limited to such a structure. For example, the inner wall of the cover 4 may include a recess or a projection and the coupling member 7 may be shaped to be fitted to the recess or the projection to further ensure engagement of the cover 4 and the coupling member 7. Additionally, the cover 4 and the coupling member 7 may be integrally fixed through brazing or the like.

DESCRIPTION OF REFERENCE CHARACTERS

1: Housing
2: Fuel chamber
3: Upper portion of housing
4: Cover
6: Coiled wave spring 6a: Waveform mountain
6b: Waveform valley
6c: Upper seat winding
6d: Lower seat winding
6e: End
6f: End
7: Coupling member
7a: Central portion
7b: Hole
7c: Circumferential region
7d: Tab
10: Diaphragm damper device
11: Lower diaphragm damper
12: Upper diaphragm damper
14: Rubber elastic member
15: Diaphragm
15a: Circumferential region
15b: Central portion
16: High-pressure chamber
17: Cover member
17a: Holding portion
17b: Hole
17c: Tab
18: Punched portion
20: Holding member

The invention claimed is:

1. A damper system comprising:
a cover coupled to a housing, wherein the cover cooperates with the housing to define a fuel chamber;
a coupling member attached to an inner side of the cover;
a diaphragm damper device arranged in the fuel chamber; and
a coiled wave spring arranged between the diaphragm damper device and the cover and configured to fix the diaphragm damper device to the housing with its elastic force,
wherein the coiled wave spring includes a coil portion, a winding initiation portion, and a winding termination portion, wherein the winding initiation portion and the winding termination portion form flat seat windings, the seat windings each have a larger outer diameter than the coil portion, and one of the seat windings is configured to be fixed to the diaphragm damper device;
wherein one of the seat windings is fixed to the diaphragm damper device;
wherein another one of the seat windings is fixed to the coupling member;
wherein the coupling member is located intermediate the coiled wave spring and the cover; and
wherein a tab of the diaphragm damper device is swaged onto said one of the seat windings, and a tab of the coupling member is swaged onto said another one of the seat windings.

2. The damper system according to claim 1, wherein:
the cover is separate from the coupling member.

3. The damper system according to claim 1, wherein:
wherein the seat windings and the coil portion have the same width.

4. The damper system according to claim 1, wherein:
the coil portion extends spirally and has a plurality of waved windings defining ridges and valleys;
wherein the ridges and valleys of one of the waved windings are opposed to the ridges and valleys of an adjacent waved winding.

5. The coiled wave spring according to claim 1, wherein:
the coil portion extends spirally and has a plurality of waved windings defining ridges and valleys;
wherein the ridges and valleys of one of the waved windings are opposed to the ridges and valleys of an adjacent waved winding; and
wherein at least one of the waved windings of the plurality of waved windings has at least two ridges within a 180 degree span of said at least one waved winding which interface with a corresponding at least two valleys of an adjacent waved winding along a 180 degree span of the adjacent waved winding.

6. The damper system according to claim 1, wherein:
the coupling member is in direct contact with the inner side of the cover.

7. The damper system according to claim 1, wherein:
the coupling member is disk shaped and includes a central portion shaped in conformance with the inner side of the cover.

8. The damper system according to claim 7, wherein:
the central portion includes a hole.

9. The damper system according to claim 7, wherein:
the coupling member includes a flat circumferential portion engageable with a corresponding flat portion of the winding initiation portion of the coiled wave spring.

10. The damper system according to claim 9, wherein:
the circumferential portion includes a plurality of tabs extending from an outer edge of the circumferential portion for coupling of the coupling portion to the coiled wave spring;
wherein the plurality of tabs are swaged onto said another one of the seat windings.

11. A damper system comprising:
a coupling member;
a diaphragm damper device; and
a coiled wave spring arranged between the diaphragm damper device and the coupling member, the coiled wave spring including a coil portion, a winding initiation portion, and a winding termination portion, wherein the winding initiation portion and the winding termination portion form flat seat windings, the seat windings each having a larger outer diameter than the coil portion;
wherein one of the seat windings is fixed to the diaphragm damper device;
wherein another one of the seat windings is fixed to the coupling member;
wherein the coupling member, the coiled wave spring and diaphragm damper device are arranged in stacked vertical relation to one another; and
wherein a tab of the diaphragm damper device is swaged onto said one of the seat windings, and a tab of the coupling member is swaged onto said another one of the seat windings.

12. The damper system of claim 11, wherein:
the coupling member is disk shaped.

13. The damper system according to claim 12, wherein:
the central portion includes a hole.

14. The damper system according to claim 11, wherein:
the coupling member includes a flat circumferential portion engageable with a corresponding flat portion of the winding initiation portion of the coiled wave spring.

15. The damper system according to claim 14, wherein:
the circumferential portion includes a plurality of tabs extending from an outer edge of the circumferential portion for coupling of the coupling portion to the coiled wave spring;

wherein the plurality of tabs are swaged onto said another one of the seat windings.

* * * * *